(12) United States Patent
Lu

(10) Patent No.: US 7,100,902 B1
(45) Date of Patent: Sep. 5, 2006

(54) HAND-PULLED DEVICE FOR WINDING BINDING STRAP

(76) Inventor: Jung-Wen Lu, No. 749, Renhua Rd., Dali City, Taichung County 412 (TW)

(*) Notice: Subject to any disclaimer, the term of this patent is extended or adjusted under 35 U.S.C. 154(b) by 0 days.

(21) Appl. No.: 11/183,764

(22) Filed: Jul. 19, 2005

(51) Int. Cl.
*B65H 77/00* (2006.01)

(52) U.S. Cl. .................. 254/218; 24/69 ST; 24/71 ST; 24/71.1

(58) Field of Classification Search .............. 254/213, 254/214, 216, 218, 225; 24/68 R, 69 ST, 24/69 CT, 71 ST, 71.1
See application file for complete search history.

(56) References Cited

U.S. PATENT DOCUMENTS

| 4,530,135 | A | * | 7/1985 | Hsiang | 24/68 CD |
| 5,611,520 | A | * | 3/1997 | Soderstrom | 254/218 |
| 6,102,371 | A | * | 8/2000 | Wyers | 254/218 |
| 6,609,275 | B1 | * | 8/2003 | Lin | 24/68 CD |

* cited by examiner

*Primary Examiner*—Emmanuel M Marcelo
(74) *Attorney, Agent, or Firm*—Rosenberg, Klein & Lee

(57) ABSTRACT

A hand-pulled device for winding binding strap, including a base seat, a fastening mechanism drivable by a movable arm and a winding mechanism having a winding reel for winding the binding strap thereon. A pivotally swinging track of the movable arm relative to the base seat defines a movement space. The outer rim of the wound binding strap is at least partially enclosed in the movement space for minifying the volume of the hand-pulled device.

3 Claims, 8 Drawing Sheets

HAND-PULLED DEVICE FOR WINDING BINDING STRAP

BACKGROUND OF THE INVENTION

The present invention is related to a hand-pulled device for winding binding strap. The hand-pulled device has minified volume without occupying much room.

When transferring goods, a hand-pulled device for winding a binding strap is often used to fix the goods. After used or when collecting the binding strap, the binding strap is wound on a reel of the hand-pulled device to avoid tangling of the binding strap.

FIGS. 7 and 8 show an improved conventional hand-pulled device for winding a binding strap. The hand-pulled device includes a base seat 7, a fastening mechanism 8 connected with one end of the base seat 7 and a binding strap winder 9 mounted at the other end of the base seat 7. The binding strap 91 is extended through the rotary shaft 82 of the fastening mechanism 8 and wound on a reel (not shown) inside the winder 9. By means of reciprocally swinging the movable arm 81 of the fastening mechanism 8, the rotary shaft 82 can be driven and rotated to fasten the binding strap 91. After used, a torque spring disposed in the winder 9 is controlled to drive the reel for winding back the binding strap 91.

The above hand-pulled device can automatically wind back the binding strap so that a user no more needs to manually wind back the binding strap. However, the binding strap winder 9 must have a housing large enough for enclosing the binding strap 91. Furthermore, a space must be reserved for the movable arm 81 of the fastening mechanism 8 to pivotally swing. Therefore, the fastening mechanism 8 and the binding strap winder 9 of the hand-pulled device will occupy much room and thus the volume of the hand-pulled device will be increased.

SUMMARY OF THE INVENTION

It is therefore a primary object of the present invention to provide a hand-pulled device for winding binding strap, including a base seat, a fastening mechanism drivable by a movable arm and a winding mechanism for winding the binding strap thereon. A pivotally swinging track of the movable arm relative to the base seat defines a movement space. The outer rim of the wound binding strap is enclosed in the movement space for minifying the volume of the hand-pulled device.

According to the above object, the hand-pulled device for winding binding strap of the present invention includes:

a base seat having a first connecting section and a second connecting section distal from each other;

a rotary shaft assembly pivotally disposed on the first connecting section of the base seat, the rotary shaft assembly including a first shaft member and a second shaft member arranged side by side and spaced from each other by a predetermined distance;

a fastening mechanism including a movable arm pivotally connected with the rotary shaft assembly, the movable arm being pivotally swingable to drive a locating mechanism for driving and rotating the rotary shaft assembly;

a winding mechanism connected with the second connecting section of the base seat, the winding mechanism including a winding reel and a crank connected with the winding reel, whereby an operator can crank the crank to drive and rotate the winding reel; and a binding strap having two ends distal from each other, one end of the binding strap being extended through the space between the first and second shaft members of the rotary shaft assembly and connected with the winding reel of the winding mechanism, whereby the binding strap can be wound on outer circumference of the winding reel to form an outer rim.

A pivotally swinging track of the movable arm relative to the base seat defines a movement space. The outer rim of the wound binding strap is at least partially enclosed in the movement space.

The present invention can be best understood through the following description and accompanying drawings wherein:

DETAILED DESCRIPTION OF THE PREFERRED EMBODIMENTS

Figure 1:
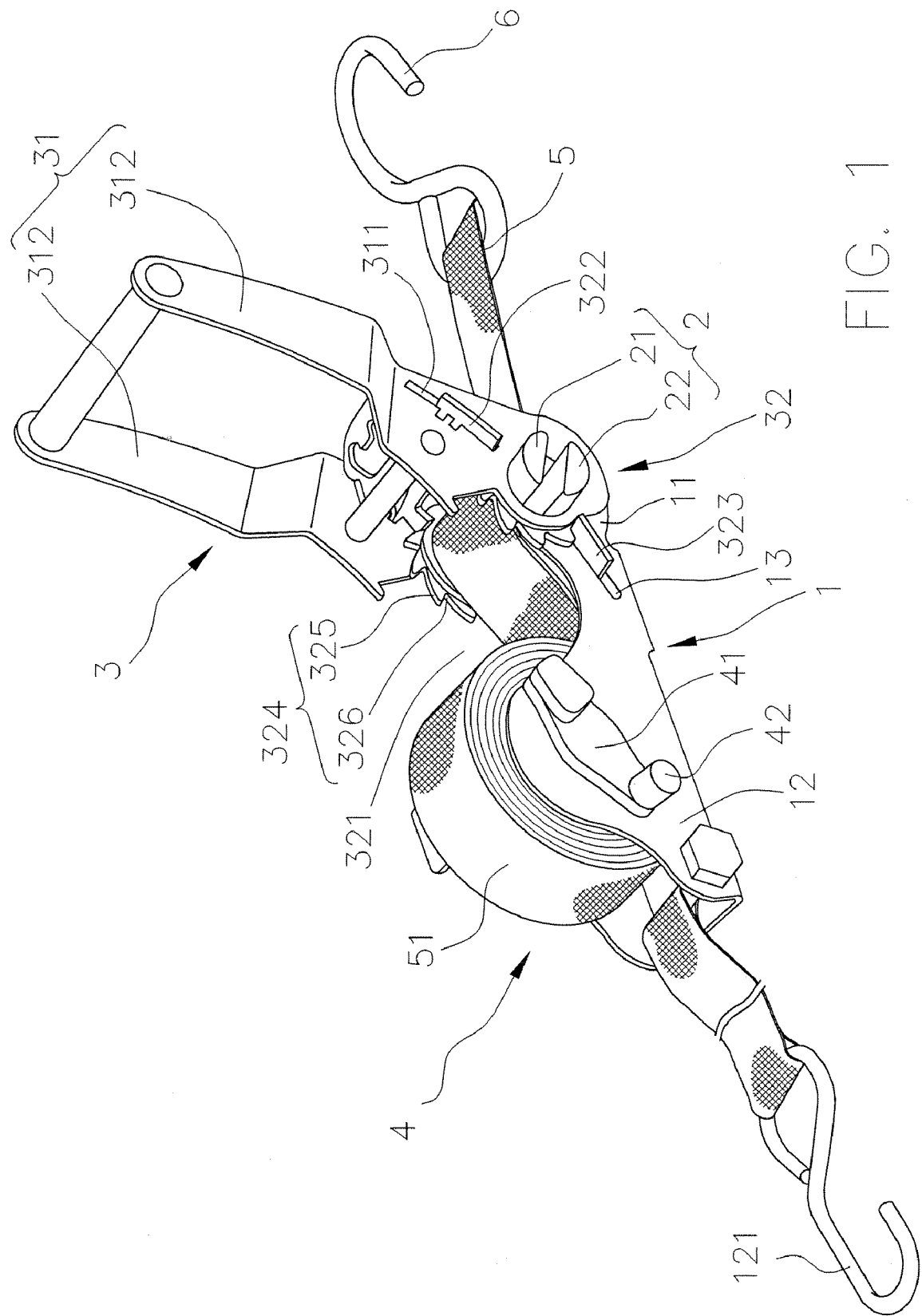
FIG. 1 is a perspective assembled view of the present invention.
Figure 2:
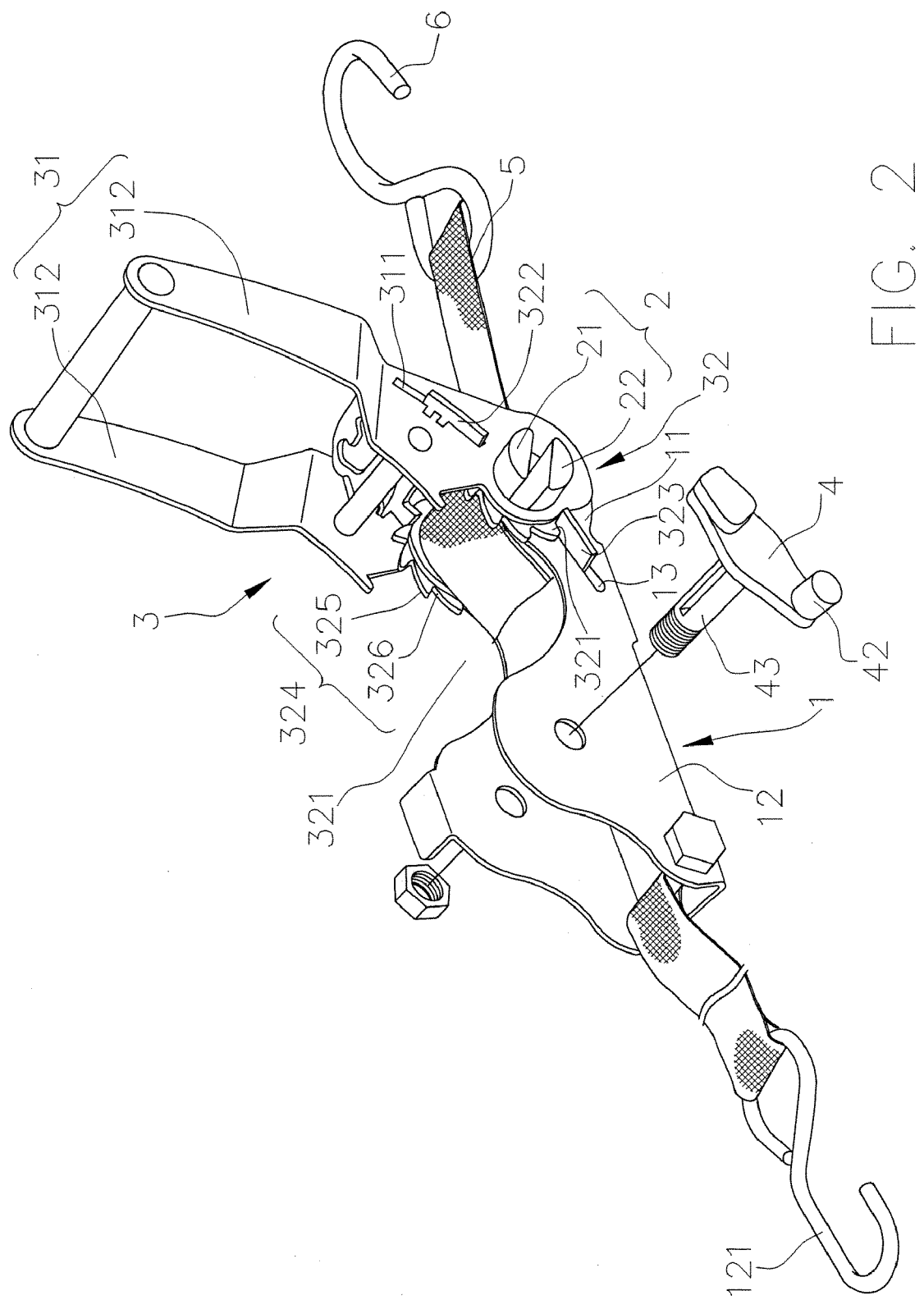
FIG. 2 is a perspective exploded view of the present invention.
Figure 3:
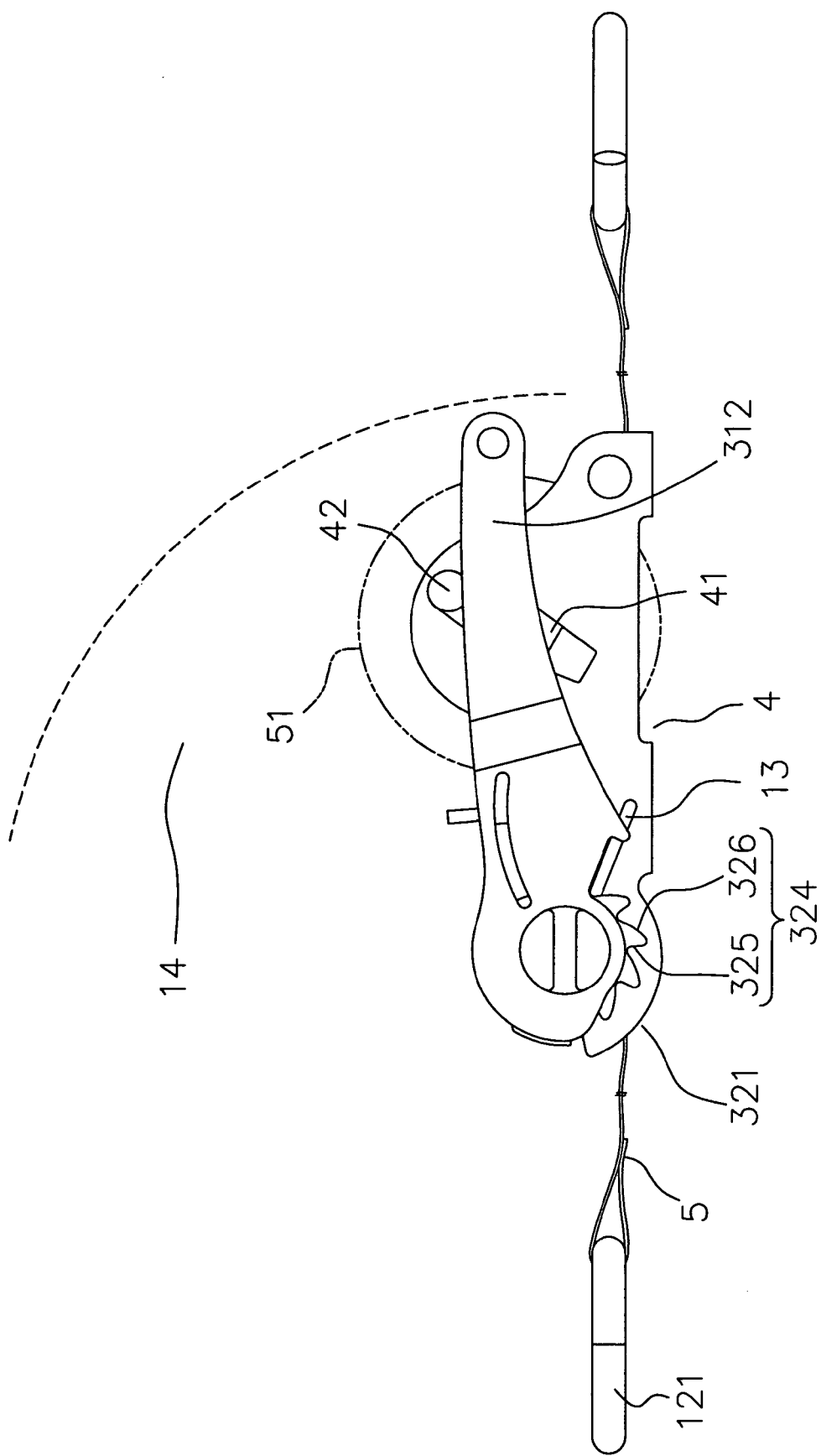
FIG. 3 is a side view of the present invention, showing the operation thereof in one state.
Figure 4:
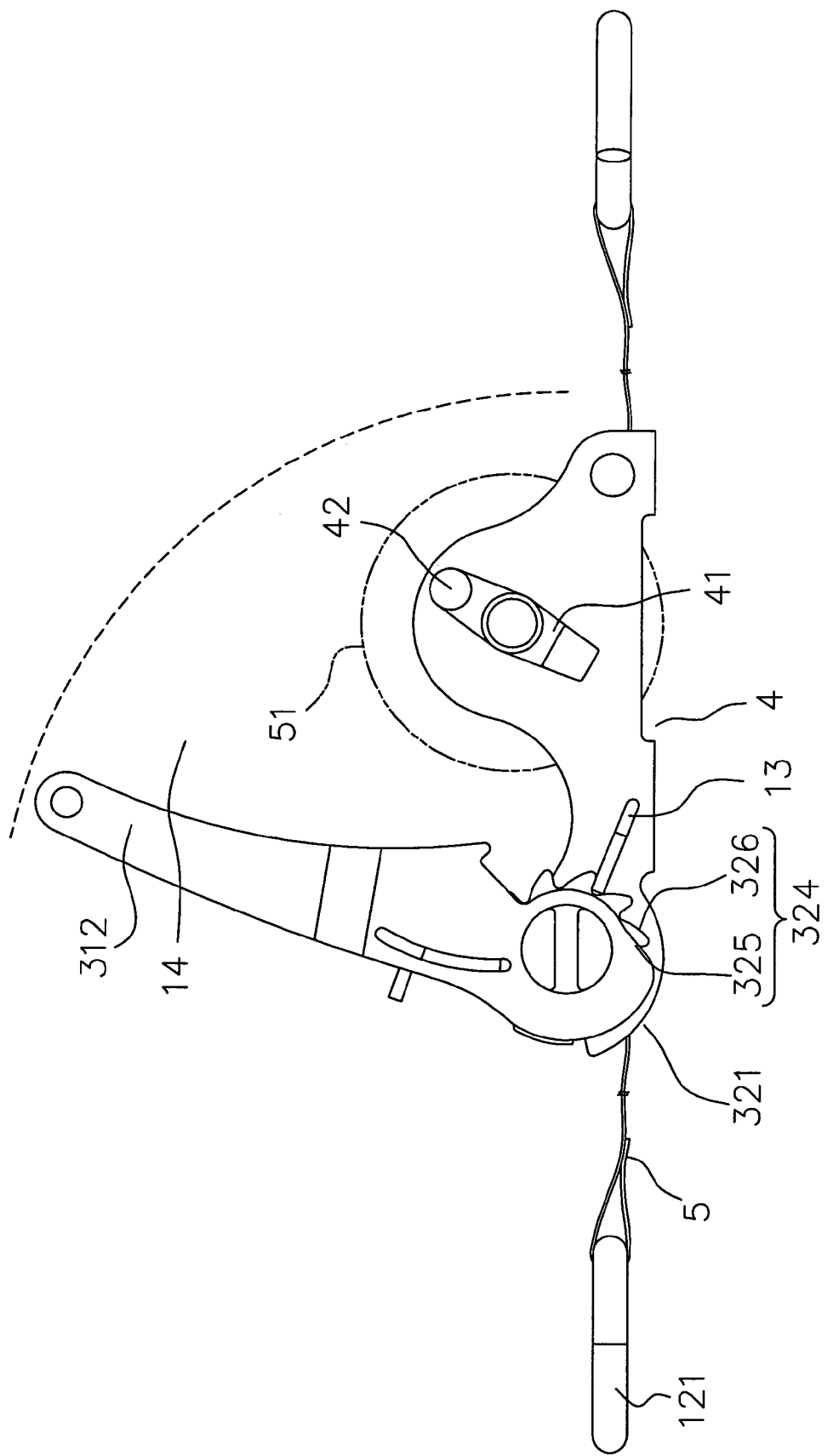
FIG. 4 is a side view of the present invention, showing the operation thereof in another state.

Please refer to FIGS. 1 to 4. The hand-pulled device for winding binding strap of the present invention includes a base seat 1, a rotary shaft assembly 2, a fastening mechanism 3, a winding mechanism 4 and a binding strap 5.

The base seat 1 has a first connecting section 11 and a second connecting section 12 distal from each other. The rotary shaft assembly 2 is pivotally disposed on the first connecting section 11 of the base seat 1. The rotary shaft assembly 2 is composed of a first shaft member 21 and a second shaft member 22 spaced from each other by a predetermined distance and arranged side by side.

The fastening mechanism 3 includes a movable arm 31 pivotally connected with the rotary shaft assembly 2. In this embodiment, the movable arm 31 has two symmetric arm boards 312. The movable arm 31 can be pivoted to drive a locating mechanism 32 for driving the rotary shaft assembly 2 to rotate. The locating mechanism 32 includes two ratchet wheels 321, a first arresting plate 322 and a second arresting plate 323. The two ratchet wheels 321 are respectively fitted on two ends of the rotary shaft assembly 2. Each ratchet 324 of the ratchet wheel 21 has an arc side 325 and a steep side 326.

The movable arm 31 is formed with a slot 311 in which the first arresting plate 322 is slidably fitted. The base seat 1 is formed with a slot 13 in which the second arresting plate 323 is slidably fitted. The arresting plates 322, 323 are pushed by springs to abut against the ratchet wheels 321. By means of pivoting the movable arm 31, the arresting plates 322, 323 can be disengaged from the ratchet wheels 321.

When the movable arm 31 is pivoted, the first arresting plate 322 pushes the steep side 326 of the ratchet wheel to drive the rotary shaft assembly 2 to rotate. When the movable arm 31 gets close to the base seat 1, the second arresting plate 323 of the base seat is engaged with the arc section 325 of the ratchet wheel 321 to restrict the ratchet wheel 321 from rotating in reverse direction.

The winding mechanism 4 is connected with the second connecting section 12 of the base seat 1. The winding mechanism 4 includes a crank 41 and a winding reel 43. An operator can crank the crank 41 to drive the winding reel 43 to rotate.

One end of the binding strap 5 extends through the space between the first and second shaft members 21, 22 of the rotary shaft assembly 2 and then is connected with the winding reel 43 of the winding mechanism 4.

In operation, after the goods are tied with the binding strap, the movable arm 31 is reciprocally pivotally swung to wind the binding strap 5 on the rotary shaft assembly 2 for truly fastening the goods. When cranking the crank 41, the binding strap 5 is wound on the winding reel 43.

The pivotally swinging track of the movable arm 31 relative to the base seat 1 defines a movement space 14. On the other hand, the binding strap 5 is wound on outer circumference of the winding reel 43 to form an outer rim 51. The outer rim 51 is totally enclosed in the movement space 14 between the two arm boards 312 of the movable arm 31. Therefore, the binding strap 5 is accommodated in the movement space 14 so as to minify the volume of the hand-pulled device.

Figure 5:
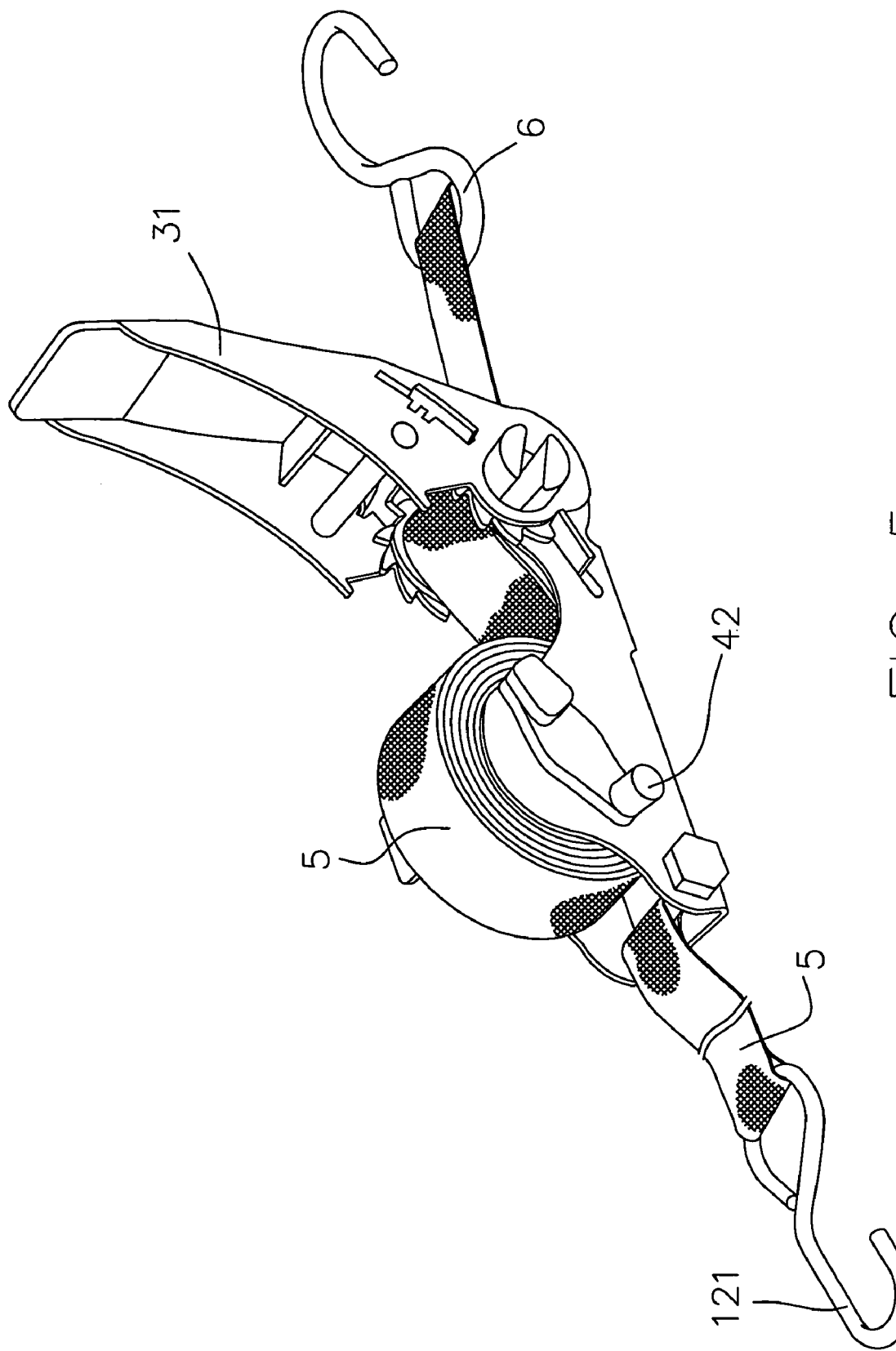
FIG. 5 is a perspective assembled view of a second embodiment of the present invention.
Figure 6:
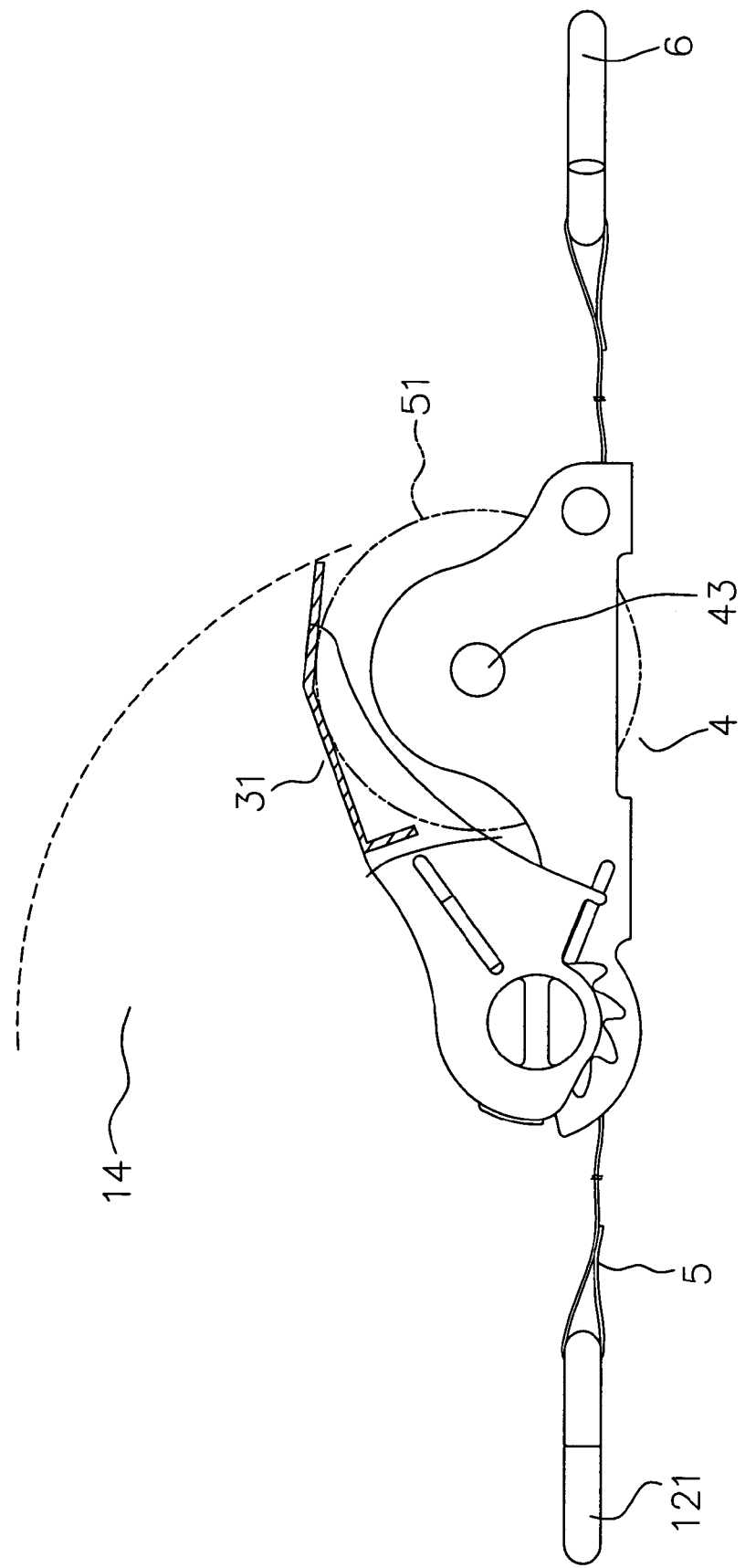
FIG. 6 is a side view of the second embodiment of the present invention, showing the operation thereof.
Figure 7:
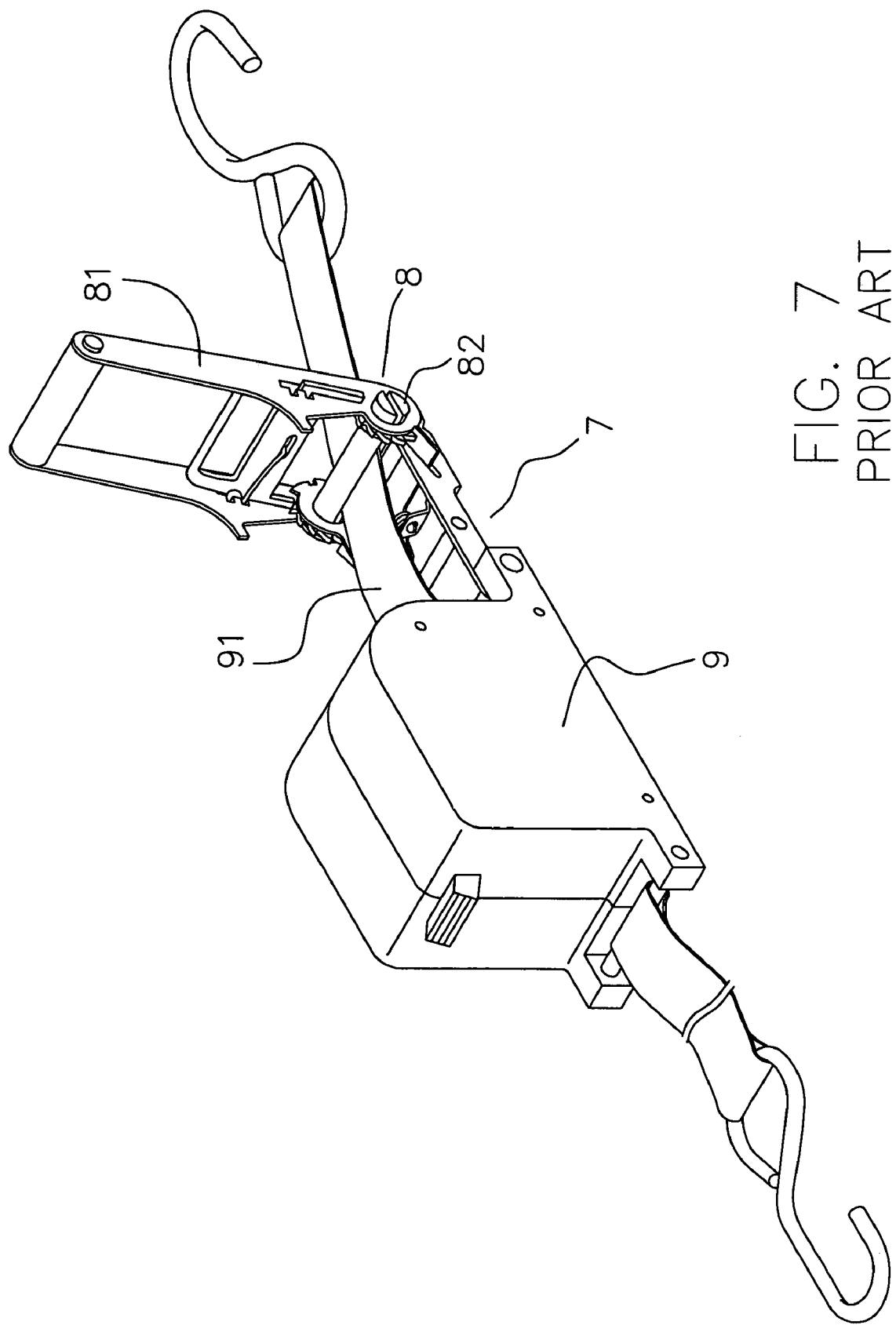
FIG. 7 is a perspective assembled view of a conventional hand-pulled device for winding a binding strap.
Figure 8:
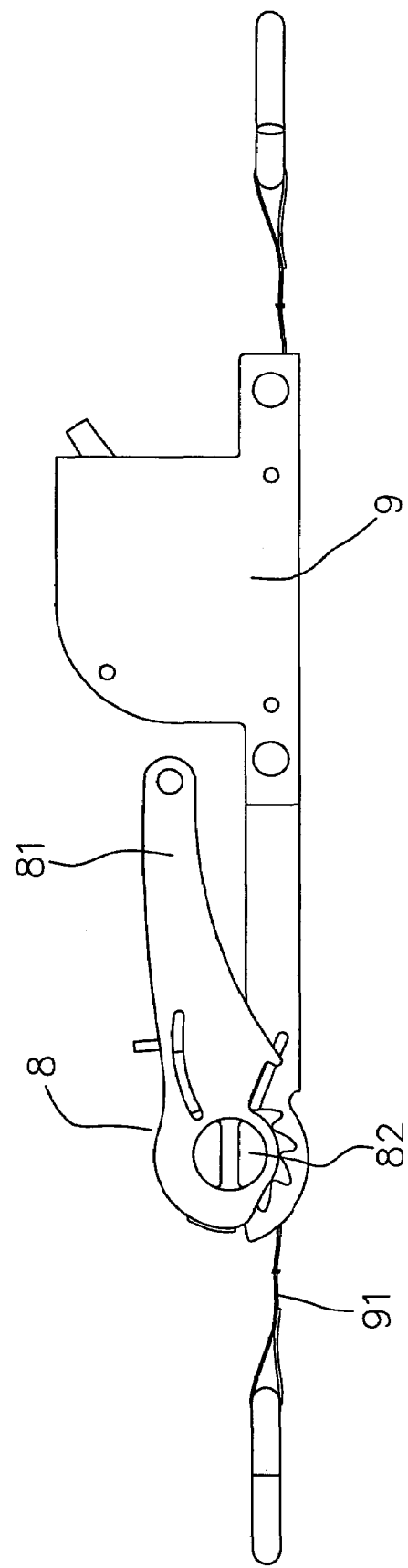
FIG. 8 is a side view of the conventional hand-pulled device for winding a binding strap.

FIGS. 5 and 6 show a second embodiment of the present invention, in which the movable arm 31 is leant on the outer rim 51 of the wound binding strap 5. This can also minify the volume of the hand-pulled device.

The above embodiments are only used to illustrate the present invention, not intended to limit the scope thereof. Many modifications of the above embodiments can be made without departing from the spirit of the present invention.

What is claimed is:

1. A hand-pulled device for winding a binding strap, comprising:
    a base seat having a first connecting section and a second connecting section distal from each other;
    a rotary shaft assembly pivotally disposed on the first connecting section of the base seat;
    a fastening mechanism including a movable arm pivotally connected with the rotary shaft assembly, the movable arm having a pair of symmetrically disposed arm boards laterally spaced one from the other and defining a handle space therebetween, the movable arm being pivotally swingable to drive a locating mechanism for driving and rotating the rotary shaft assembly;
    a winding reel rotatably connected to the second connecting section of the base seat; and
    a binding strap extending through the rotary shaft assembly, one end of the binding strap being connected with the winding reel, the binding strap being windable on an outer circumference of the winding reel to form an outer rim, the movable arm being pivotable over the winding reel and the outer rim of the wound binding strap being passed through the handle space.

2. The hand-pulled device for winding a binding strap as claimed in claim 1, wherein the rotary shaft assembly includes a first shaft member and a second shaft member arranged side by side and spaced from each other for the binding strap to pass therethrough.

3. A hand-pulled device for winding a binding strap, comprising:
    a base seat having a first connecting section and a second connecting section distal from each other;
    a rotary shaft assembly pivotally disposed on the first connecting section of the base seat;
    a fastening mechanism including a movable arm pivotally connected with the rotary shaft assembly the movable arm being pivotally swingable to drive a locating mechanism for driving and rotating the rotary shaft assembly;
    a winding mechanism connected with the second connecting section of the base seat for driving a winding reel to rotate, the winding mechanism including a crank fixedly connected with the winding reel; and,
    a binding strap extending through the rotary shaft assembly, one end of the binding strap being connected with the winding reel of the winding mechanism, the binding strap being windable on an outer circumference of the winding reel to form an outer rim, a pivotally swinging track of the movable arm relative to the base seat defining a movement space, the outer rim of the wound binding strap being at least partially disposed in the movement space.

* * * * *